United States Patent [19]

Lee et al.

[11] Patent Number: 4,781,816

[45] Date of Patent: Nov. 1, 1988

[54] CRACKING PROCESS

[75] Inventors: Fu Ming Lee; Clifford M. Shiblom, Jr., both of Bartlesville, Okla.

[73] Assignee: Phillips Petroleum Company, Bartlesville, Okla.

[21] Appl. No.: 110,319

[22] Filed: Oct. 19, 1987

[51] Int. Cl.$^4$ .............................................. C10G 11/05
[52] U.S. Cl. .................................. 208/120; 208/251 R; 208/253; 208/52 CT; 502/516; 502/521
[58] Field of Search .............. 208/113, 120, 52 CT, 208/251 R, 253; 502/516, 518, 521

[56] References Cited

U.S. PATENT DOCUMENTS

| | | | |
|---|---|---|---|
| 3,507,778 | 4/1970 | Gladrow et al. | 208/111 |
| 3,699,037 | 10/1972 | Annesser et al. | 208/120 |
| 3,835,031 | 9/1974 | Bertolacini et al. | 208/120 |
| 3,838,040 | 9/1974 | Ward | 208/111 |
| 3,909,392 | 9/1975 | Horecky, Jr. et al. | 208/120 |
| 4,137,151 | 1/1979 | Csicsery | 208/120 |
| 4,146,463 | 3/1979 | Radford et al. | 208/120 |
| 4,147,613 | 4/1979 | Gladrow | 208/120 |
| 4,158,621 | 6/1979 | Swift et al. | 208/114 |
| 4,182,693 | 1/1980 | Gladrow et al. | 252/455 Z |
| 4,208,269 | 6/1980 | Gladrow et al. | 208/120 |
| 4,239,654 | 12/1980 | Gladrow et al. | 252/455 Z |
| 4,287,048 | 9/1981 | Gladrow et al. | 208/120 |
| 4,292,169 | 9/1981 | Gladrow | 208/120 |
| 4,312,743 | 1/1982 | Tu et al. | 208/120 |
| 4,325,809 | 4/1982 | Bartholic | 208/127 |
| 4,377,470 | 3/1983 | Kettinger, Jr. et al. | 208/120 |
| 4,414,098 | 11/1983 | Zandona et al. | 208/120 |
| 4,423,019 | 12/1983 | Bertolacini et al. | 423/244 R |
| 4,424,116 | 1/1984 | Kettinger, Jr. | 208/120 |
| 4,432,890 | 2/1984 | Beck et al. | 208/120 |
| 4,450,241 | 5/1984 | Hettinger et al. | 208/113 |
| 4,451,355 | 5/1984 | Mitchell et al. | 208/113 |
| 4,465,588 | 8/1984 | Occelli et al. | 208/120 |
| 4,469,588 | 9/1984 | Hettinger et al. | 208/251 R |
| 4,515,902 | 5/1985 | Shioiri et al. | 502/64 |
| 4,515,903 | 5/1985 | Otterstedt et al. | 502/68 |
| 4,549,958 | 10/1985 | Beck et al. | 208/252 |
| 4,589,978 | 5/1986 | Green et al. | 208/120 |

OTHER PUBLICATIONS

"Petroleum Refining", by J. Gary and G. Handwerk, 1975, pp. 86-95, 101, 110 and 111.

"Rapid Methods of Determining the Metals Resistance of Cracking Catalysts", by S. Jaras, Applied Catalysis, 2 (1982), pp. 207-218.

Primary Examiner—Anthony McFarlane
Attorney, Agent, or Firm—K. K. Brandes

[57] ABSTRACT

A process for cracking hydrocarbon containing feed streams, which have an initial boiling point of at least 400° F. and contain at least about 5 ppmw vanadium, is carried out in the presence of a catalyst composition comprising a physical mixture of (a) zeolite embedded in an inorganic refractory matrix material and (b) at least one oxide of Be, Mg, Ca, Sr, Ba or La, preferably MgO, on a silica containing support material.

20 Claims, No Drawings

CRACKING PROCESS

BACKGROUND OF THE INVENTION

This invention relates to a catalytic cracking process. In another aspect, this invention relates to a process for cracking heavy oils.

Cracking catalysts comprising zeolite embedded in a matrix of inorganic refractory materials are known. Also the use of these cracking catalysts for cracking of hydrocarbon containing oils, such as gas oil, is known. Frequently, these known cracking catalysts exhibit conversion and selectivity problems when heavier feedstocks, such as topped crudes and hydrotreated residua, which also contain metal impurities, are employed. This invention is directed to the use of a cracking catalyst composition which exhibits improved cracking performance in processes for cracking heavy oils which contain vanadium compounds as impurities.

SUMMARY OF THE INVENTION

It is an object of this invention to provide a process for cracking hydrocarboncontaining feedstocks, which contain vanadium compounds as impurities. It is another object of this invention, to provide a cracking process wherein a blend of an inorganic refractory material and a zeolite catalyst composition is employed. Other objects and advantages will become apparent from the detailed description and the appended claims.

In accordance with this invention, a catalytic cracking process comprises the step of contacting in a cracking zone a hydrocarbon containing feed stream having an initial boiling point of at least 400° F., measured at about 0 psig, and containing at least about 5 ppmw vanadium, with a cracking catalyst composition comprising a physical mixture of (a) zeolite embedded in an inorganic refractory matrix material, and (b) at least one oxide of a metal selected from the group consisting of Be, Mg, Ca, Sr, Ba and La (preferably MgO) on a support material comprising silica, under such cracking conditions as to obtain at least one liquid hydrocarbon containing product stream (i.e., one or two or more than two product streams) having a lower initial boiling point and a higher API gravity than said feed stream.

Preferably, the cracking process of this invention comprises the additional steps of removing said cracking catalyst composition from said cracking zone after it has been used in said cracking zone;

separating the thus removed cracking catalyst composition from gases and said at least one liquid product stream;

exposing at least a portion of the thus separated catalyst composition to flowing steam (for stripping of adhered liquids from the catalyst composition); and heating the thus steam-stripped cracking catalyst composition with a free oxygen containing gas, so as to substantially remove coke deposits from the catalyst composition, substantially convert vanadium compounds deposited thereon to vanadium oxide, and thus obtain a regenerated catalyst composition.

More preferably the cracking process of this invention comprises the additional step of recycling at least a portion of the regenerated catalyst (to which more preferably fresh, unused catalyst composition has been added so as to provide an equilibrium catalyst) to said cracking zone.

DETAILED DESCRIPTION OF THE INVENTION

Cracking Catalyst Composition

The zeolite component of the cracking catalyst composition used in the process of this invention can be any natural or synthetic crystalline aluminosilicate zeolite which exhibits cracking activity. Non-limiting examples of such zeolites are faujasite, chabazite, mordenite, offretite, erionite, Zeolon, zeolite X, zeolite Y, zeolite L, zeolite ZSM, and the like, and mixtures thereof. Additional examples of suitable zeolites are listed in U.S. Pat. No. 4,158,621, the disclosure of which is herein incorporated by reference. It is within the scope of this invention to use zeolites from which a portion of Al has been removed from the crystalline framework, and/or which have been ion-exchanged with rare earth metal or ammonium or by other conventional ion-exchange methods. Preferably, a synthetic faujasite of the Y-type (zeolite Y), more preferably a rare earth-exchanged zeolite Y (REY zeolite), is employed as catalyst component (a).

The inorganic refractory matrix material in which the zeolite is embedded can be any suitable amorphous or crystalline refractory material, such as silica, alumina, silica-alumina, aluminosilicates (e.g., clays) aluminum phosphate, and the like, and mixtures thereof. Preferably, amorphous silica-alumina is used as matrix material, in particular one used in commercially available zeolite-containing cracking catalyst compositions.

The zeolite can be embedded in the inorganic refractory matrix material in any suitable manner so as to prepare cracking catalyst component (a). Preferably, a slurry of the zeolite in a liquid (more preferably in water) and a slurry of the matrix material in a liquid (more preferably water) are mixed; the thus obtained dispersed zeolite/matrix mixture is separated by any suitable method (more preferably by filtration) from the liquid portion of the slurry mixture; the separated intimate zeolite/matrix mixture is at least partially dried more preferably at about 100°–200° C.) and then calcined (more preferably by heating in air, at about 600°–900° C. for about 1–5 hours). The zeolite/matrix material can be ground and sieved during any phase of the preparation (preferably after drying) so as to obtain a material having a desired particle size range (preferably 10/40 mesh). The material can also be exposed to steam, e.g., at about 700°–1500° F.

Catalyst component (a), i.e., the calcined intimate mixture of zeolite and matrix material (i.e., zeolite embedded in the inorganic refractory matrix material) generally has a BET/$N_2$ surface area (ASTM D3037) in the range of from about 50 to about 800 m$^2$/g, preferably from about 100 to about 400 m$^2$/g. Generally, the weight ratio of zeolite to the matrix material is in the range of from about 1:30 to about 1:1, preferably from about 1:15 to about 1:3. A non-limiting example of a suitable commercial zeolite/matrix cracking catalyst composition is GX-30, described in Example I.

Component (b) of the cracking catalyst composition comprises at least one metal oxide selected from the group consisting of BeO, MgO, CaO, SrO, BaO and La$_2$O$_3$, and a support material comprising silica. Preferably, the metal oxide is MgO and the support material consists essentially of silica. More preferably, silica has a BET/$N_2$ surface area of about 100–500 m$^2$/g. Generally, the weight ratio of MgO to $SiO_2$ is in the range of from about 0.1:1 to about 20:1, preferably from about 0.5:1 to about 5:1.

Component (b) can be prepared by any suitable means. Preferably a silica-containing material (preferably $SiO_2$) is impregnated with a suitable magnesium compound dissolved in a suitable liquid (preferably water or an alcohol such as methanol), dried and calcined at conditions substantially the same as those described for cracking catalyst component (a), so as to substantially decompose the Mg compound to MgO. Non-limiting examples of suitable Mg compounds are $Mg(NO_3)_2$, $Mg(HCO_3)_2$, $Mg(HSO_4)_2$, $MgSO_4$, Mg formate, Mg acetate, Mg oxalate and other Mg carboxylates, and mixtures of two or more Mg compounds. Preferably Mg acetate is used for impregnating silica. The BET/$N_2$ surface area (ASTM D3037) of catalyst component (b) is generally in the range of from about 100 to about 500 $m^2/g$.

Cracking catalyst components (a) and (b) can be mixed (blended) by any suitable method, such as dry-blending (presently preferred) in a suitable methanical mixing/blending device; or blending of a slurry (e.g., in water) of component (a) with a slurry of component (b), followed by drying and calcining. The weight ratio of catalyst component (a) to catalyst component (b) generally is in the range of from about 1:2 to about 20:1, preferably in the range of from about 2:1 to about 8:1.

It is within the scope of this invention to have from about 0.1 to about 2.0, in particular from about 0.2 to about 0.7, weight-% V (as oxide) present on the catalyst composition, in particular when said catalyst composition comprises regenerated catalyst composition (defined below) that has been used in a process for cracking vanadium-containing heavy oils. When such heavy oils are catalytically cracked, vanadium compounds from the feed are deposited on the catalyst, and these deposits are substantially converted to vanadium oxide during oxidative regeneration. It is understood that the above-recited vanadium contents are average values for the entire catalyst composition, including equilibrium catalyst composition (defined below), and it is most likely that component (b) contains a higher weight percentage of V than component (a).

CRACKING PROCESS

The hydrocarbon containing feed stream for the process of this invention can be any feedstock containing at least 5 ppmw V (parts by weight of vanadium per million parts by weight of feed stream), preferably about 5-200 ppmw V, more preferably about 5-50 ppmw V, and having an initial boiling point (ASTM D 1160) in excess of about 400° F., preferably boiling in the range of from about 400° to about 1300° F., more preferably boiling in the range of from about 600° to about 1200° F., all measured under atmospheric pressure conditions (about 0 psig = 1 atm). A particularly preferred feed stream is a heavy oil, at least about 90 volume-% of which boils above 650° F. (at atmospheric pressure). The API$^{60}$ gravity (measured at 60° F.) of the feed generally is in the range of from about 5 to about 40, preferably from about 10 to about 30. Frequently these feedstocks also contain Ramsbottom carbon residue (ASTM D524; generally about 0.1-20 weight-%), sulfur (generally about 0.1-5 weight-%), nitrogen (generally about 0.01 weight-%), and nickel (generally about 0.1-50 ppmw).

Non-limiting examples of suitable feedstocks are topped crudes (residua), distillation bottom fractions, heavy gas oils, heavy cycle oils, slurry oils (decant oils), hydrotreated residua (i.e., having been hydrotreated in the presence of a promoted hydrotreating catalyst, preferably a Ni, Co, Mo-promoted alumina catalyst), heavy liquid coal pyrolyzates, heavy liquid products from extraction of coal, heavy liquid products from liquefaction of coal, heavy liquid products from tar sand, shale oils, heavy fractions of shale oils, and the like. Presently most preferred feedstocks are hydrotreated residua.

Any suitable reactor can be used for the catalyst cracking process of this invention. Generally a fluidized-bed catalytic cracking (FCC) reactor (preferably containing one or two or more risers) or a moving bed catalytic cracking reactor (e.g., a Thermofor catalytic cracker) is employed. Presently preferred is a FCC riser cracking unit. Examples of such FCC cracking units are described in U.S. Pat. Nos. 4,377,470 and 4,424,116, the disclosures of which are herein incorporated by reference. The cracking catalyst composition that has been used in the cracking process (commonly called "spent catalyst") contains deposits of coke and metals or compounds of metals (in particular nickel and vanadium compounds). The spent catalyst is generally removed from the cracking zone and then separated from formed gases and liquid products by any conventional separation means (e.g., in a cyclone), as is described in the above-cited patents and also in "Petroleum Refining" by James H. Gary and Glenn E. Handwerk, Marcel Dekker, Inc., 1975, the disclosure of which is herein incorporated by reference.

Adhered liquid oil is generally stripped from the spent catalyst by flowing steam (preferably having a temperature of about 700°-1,500° F.). The steam-stripped catalyst is generally heated in a free oxygen-containing gas stream in the regeneration unit of the cracking reactor, as is shown in the above-cited references, so as to produce a regenerated catalyst. Generally, air is used as the free oxygen containing gas; and the temperature of the catalyst during regeneration with air preferably is about 1100°-1400° F. (i.e., about 590°-760° C.). Substantially all coke deposits are burned off and metal deposits (in particular vanadium compounds) are at least partially converted to metal oxides during regeneration. Enough fresh, unused cracking catalyst is generally added to the regenerated cracking catalyst, so as to provide a so-called equilibrium catalyst of desirably high cracking activity. At least a portion of the regenerated catalyst, preferably equilibrium catalyst, is generally recycled to the cracking reactor. Preferably the recycled regenerated catalyst, preferably recycled equilibrium catalyst, is transported by means of a suitable lift gas stream (e.g., steam and/or hydrogen and/or gaseous hydrocarbons) to the cracking reactor and introduced to the cracking zone (with or without the lift gas).

Specific operating conditions of the cracking operation depend greatly on the type of feed, the type and dimensions of the cracking reactor and the oil feed rate. Examples of operating conditions are described in the above-cited references and in many other publications. In an FCC operation, generally the weight ratio of catalyst composition to oil feed (i.e., hydrocarbon-containing feed) ranges from about 2:1 to about 10:1, the contact time between oil feed and catalyst is in the range of about 0.2 to about 3 seconds, and the cracking temperature is in the range of from about 800° to about 1200° F. Generally steam is added with the oil feed to the FCC reactor so as to aid in the dispersion of the oil as droplets. Generally the weight ratio of steam to oil feed is in the range of from about 0.01:1 to about 0.5:1. Hydrogen gas can also be added to the cracking reactor; but presently $H_2$ addition is not a preferred feature of this invention. Thus, added hydrogen gas should preferably be substantially absent from the cracking zone.

The separation of liquid products into various gaseous and liquid product fractions can be carried out by any conventional separation means, generally by fractional distillation. The most desirable product fraction is gasoline (ASTM boiling range: about 180°–400° F.). Non-limiting examples of such separation schemes are shown in "Petroleum Refining" by James H. Gary and Glenn E. Handwerk, cited above.

The following examples are presented to further illustrate the invention and are not to be considered unduly limiting the scope of this invention.

EXAMPLE I

This example illustrates the preparation of several cracking catalyst compositions, their impregnation with vanadium, and the performance of these V-impregnated catalyst compositions in cracking tests (so as to simulate cracking performance of V-contaminated equilibrium cracking catalysts). Composition A was prepared as follows. 59.5 grams of Grade 52 silica (provided by Davison Chemical Division of W. R. Grace and Company, Baltimore, MD; surface area: 340 m²/g) were mixed with a solution of 7.9 grams of $Mg(CH_3CO_2)_2.4H_2O$ in 150 cc methanol. The thus obtained mixture was dried on a hot plate (at about 210° F.), slowly heated to 900° F. in $N_2$ (so as to decompose organic compounds), and then calcined in air at 1200° F. for about 1 hour. The calcined material (1.5 weight-% Mg as MgO on silica) was then impregnated with a solution of vanadium acetylacetonate, dried and calcined again (as described above), so as to form *Composition AV* comprising 0.5 weight-% V (as oxide) and 1.5 weight-% Mg (as oxide) on $SiO_2$.

Two parts by weight of Composition AV were dry-blended with 8 parts by weight of Composition C, a commercial zeolite-based cracking catalyst, GX-30 (provided by Davison Division of W. R. Grace and Company); surface area: 195 m²/g; pore volume: 0.34 cc/g; containing about 33 weight-% alumina). This mixture of AV and C is labeled *Composition ACV* and is a simulated V-contaminated cracking catalyst composition.

Composition B was Grade 52 silica (without MgO), which was impregnated with 0.5 weight-% V, dried and calcined, as described above, so as to provide *Composition BV*. 2 parts by weight of Composition BV were mixed (dry-blended) with 8 parts of commercial cracking Composition C (GX-30) so as to provide *Composition BCV*.

Composition C (commercial catalyst GX-30) was impregnated with 0.5 weight-% V, dried and calcined, as described above, so as to provide *Composition CV*.

Compositions ACV, BCV and CV were evaluated in microactivity cracking tests (MAT), substantially in accordance with ASTM D3907-80, employing a gas oil having a 700°–900° F. boiling range (at atmospheric conditions) as feed. Cracking conditions were: cracking temperature of 950° F.; catalyst:oil weight ratio of 3:1; 5.0 g catalyst composition employed; 1.25 minute feed injection, followed by a 10 minute nitrogen purge; weight hourly space velocity of feed oil: 16 (g/g catalyst/hour). All three catalyst compositions had been steam-treated at 1425° F. for 7 hours in a stream of 100% steam before the cracking tests were carried out. Test results are summarized in Table I.

TABLE I

| Catalyst Composition | ACV (Invention) | BCV (Control) | CV (Control) |
|---|---|---|---|
| Conversion (Wt-%) | 51.9 | 43.4 | 47.8 |
| Gasoline Yield (Wt-%) | 37.4 | 32.7 | 34.4 |
| Light Cycle Oil Yield (Wt-%) | 17.9 | 16.4 | 17.2 |
| Heavy Cycle Oil Yield (Wt-%) | 30.2 | 40.3 | 35.2 |
| Gas Yield (Wt-%) | 7.3 | 6.4 | 6.7 |
| Coke Yield (Wt-%) | 4.4 | 3.9 | 4.9 |

Test results in Table I clearly show that Composition ACV (80 weight-% GX-30+20 weight-% V/MgO/$SiO_2$) produced better cracking results (in terms of higher feed conversion and higher gasoline yield) than Composition BCV (80 weight-% GX-30+20 weight-% V/$SiO_2$) and Composition CV (V/GX-30).

EXAMPLE II

In this example, the effect of MgO/$SiO_2$ on the cracking performance of a V-contaminated zeolite-containing cracking catalyst is compared with that of sepiolite (a clay comprising about 28 weight-% Mg, as disclosed in U.S. Pat. No. 4,464,588, Table III).

Sepiolite was impregnated with about 0.5 weight-% V dried and calcined, essentially in accordance with the procedure described in Example I so as to provide Composition DV. 2 parts by weight of Composition DV were physically mixed (blended) with 8 parts by weight of Composition C (GX-30) so as to provide *Composition DCV*.

Invention Compositions ACV and DCV were steam-treated (as described in Example I) and then tested in MAT cracking tests, in accordance with the procedure described in Example I. Test results are summarized in Table II.

TABLE II

| Catalyst Composition | ACV (Invention) | DCV (Control) |
|---|---|---|
| Conversion (Wt-%) | 48.1 | 22.7 |
| Gasoline Yield (Wt-%) | 36.3 | 16.8 |
| Light Cycle Oil Yield (Wt-%) | 18.3 | 11.4 |
| Heavy Cycle Oil Yield (Wt-%) | 33.6 | 65.9 |
| Gas Yield (Wt-%) | 8.7 | 3.9 |
| Coke Yield (Wt-%) | 3.1 | 2.1 |

Test results clearly show superior cracking performance (in terms of higher conversion, higher gasoline yield, higher light cycle oil yield and lower heavy cycle oil yield) of Composition ACV (80 weight-% GX-30+20 weight-% V/MgO/$SiO_2$) versus Composition DCV (80 weight-% GX-30+20 weight-% V/Sepiolite).

Reasonable variations, modifications and adaptations for various usages and conditions can be made within the scope of the disclosure and the appended claims, without departing from the scope of this invention.

That which is claimed is:

1. A catalytic cracking process comprising the step of contacting a hydrocarbon containing feed stream having an initial boiling point of at least 400° F., measured at about 0 psig, and containing at least about 5 ppmw vanadium with a catalyst composition comprising a physical mixture of
- (a) zeolite embedded in an inorganic refractory matrix material, and
- (b) at least one oxide of a metal selected from the group consisting of Be, Mg, Ca, Sr, and Ba on a support material comprising silica, under such cracking conditions as to obtain at least one liquid hydrocarbon containing product stream having a lower initial boiling point and a higher $API^{60}$ gravity than said feed stream.

2. A process in accordance with claim 1 wherein said at least one oxide of a metal is magnesium oxide.

3. A process in accordance with claim 2 wherein said support material consists essentially of silica.

4. A process in accordance with claim 1 wherein said zeolite is selected from the group consisting of faujasite, chabazite, mordenite, offretite, erionite, Zeolon, zeolite X, zeolite Y, zeolite L, and mixtures thereof; and said inorganic refractory matrix material is selected from the group consisting of silica, alumina, silica-alumina, aluminosilicates, aluminum phosphate and mixtures thereof.

5. A process in accordance with claim 1 wherein the weight ratio of said zeolite to said inorganic refractory matrix material is in the range of from about 1:30 to about 1:1, and the $BET/N_2$ surface area of component (a) of said catalyst composition is in the range of from about 50 to about 800 m²/g.

6. A process in accordance with claim 1 wherein in component (b) of said catalyst composition said at least one oxide of a metal is MgO, said support material consists essentially of $SiO_2$, and the weight ratio of MgO to $SiO_2$ is in the range of from about 0.1:1 to about 20:1.

7. A process in accordance with claim 6 wherein the surface area of said component (b) of said catalyst composition has a $BET/N_2$ surface area in the range of from about 100 to about 500 m²/g.

8. A process in accordance with claim 6 wherein said component (b) of said catalyst composition has been prepared by a process comprising the steps of impregnating $SiO_2$ with a suitable magnesium compound dissolved in a suitable liquid, drying the thus impregnated $SiO_2$, and calcining the dried, impregnated $SiO_2$ under such conditions as to substantially convert said magnesium compound to MgO.

9. A process in accordance with claim 1 wherein in said catalyst composition the weight ratio of component (a) to component (b) is in the range of from about 1:2 to about 20:1.

10. A process in accordance with claim 9 wherein said weight ratio of component (a) to component (b) is in the range of from about 2:1 to about 8:1, and said catalyst component (b) is MgO on $SiO_2$.

11. A process in accordance with claim 1 wherein said cracking catalyst composition comprises about 0.1 to about 2.0 weight-% V as vanadium oxide.

12. A process in accordance with claim 1 wherein said feed stream contains about 5-200 ppmw V and has a boiling range of from about 400° to about 1300° F., measured about 0 psig.

13. A process in accordance with claim 12 wherein said feed stream has an $API^{60}$ gravity in the range of from about 5 to about 40 and contains about 0.1-20 weight-% Ramsbottom carbon residue and about 0.1-5 weight-% sulfur.

14. A process in accordance with claim 1 wherein said contacting is carried out in a fluidized-bed catalytic cracking reactor.

15. A processs in accordance with claim 1 wherein said cracking conditions comprise a weight ratio of said catalyst composition to said hydrocarbon containing feed stream in the range of from about 2:1 to about 10:1, and a cracking temperature in the range of from about 800° to about 1200° F.

16. A process in accordance with claim 1 wherein steam is present during said contacting under cracking conditions and the weight ratio of steam to said hydrocarbon containing feed stream is in the range of from about 0.01:1 to about 0.5:1.

17. A process in accordance with claim 1 comprising the additional steps of
- removing said cracking catalyst composition from said cracking zone after it has been used in said cracking zone;
- separating the thus removed cracking catalyst composition from gases and said at least one liquid product stream,
- exposing at least a portion of the thus separated cracking catalyst composition to flowing steam so as to strip adhered liquids from said cracking catalyst composition, and
- heating the thus steam-stripped cracking catalyst composition with a free oxygen containing gas so as to substantially remove coke deposits from said steam-stripped cracking catalyst composition, substantially convert vanadium compounds deposited thereon to vanadium oxide, and thus obtain a regenerated cracking catalyst composition.

18. A process in accordance with claim 17 further comprising the additional step of
- recycling at least a portion of said regenerated cracking catalyst composition to said cracking zone.

19. A process in accordance with claim 18, wherein fresh, unused cracking catalyst composition has been added to said regenerated catalyst composition before said recycling.

20. A process in accordance with claim 12 wherein said feed stream is a heavy oil, at least about 90 volume-% of which boils above 650° F. at atmospheric pressure conditions.

* * * * *